July 7, 1925.
S. E. NOYES
INVESTMENT MOLD BOX
Filed Aug. 14, 1924
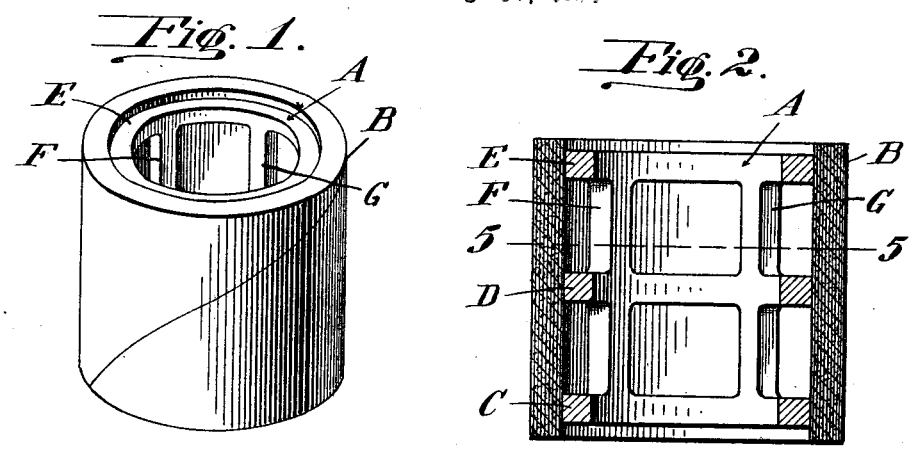
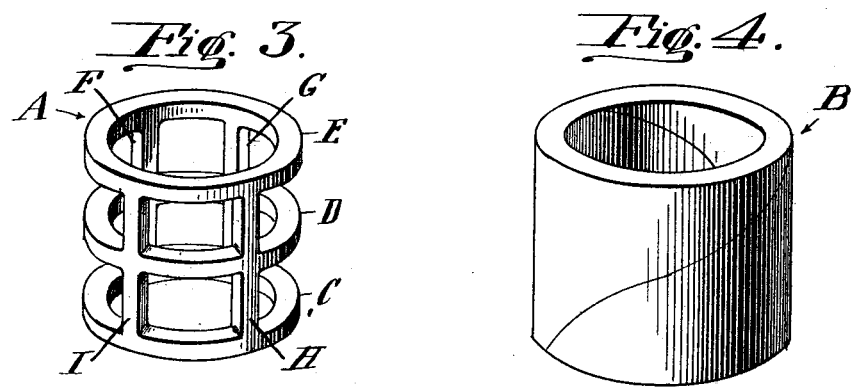
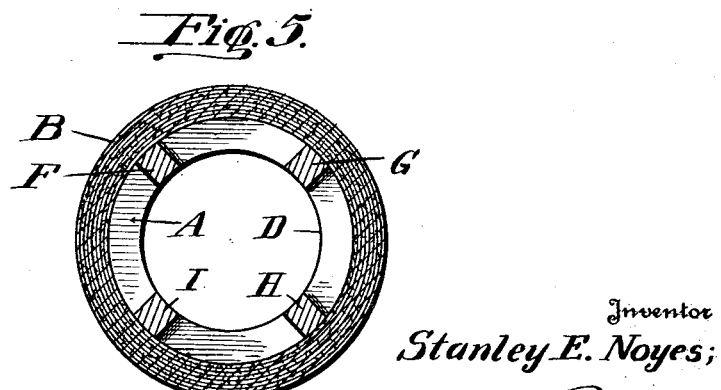
Inventor
Stanley E. Noyes;
By R. S. Berry,
Attorney Patented July 7, 1925.

1,545,061

UNITED STATES PATENT OFFICE.

STANLEY E. NOYES, OF LOS ANGELES, CALIFORNIA.

INVESTMENT MOLD BOX.

Application filed August 14, 1924. Serial No. 731,912.

*To all whom it may concern:*

Be it known that I, STANLEY E. NOYES, a citizen of the United States, residing at Los Angeles, in the county of Los Angeles and State of California, have invented new and useful Improvements in Investment Mold Boxes, of which the following is a specification.

The invention herein set forth relates to a device for forming the investment or mold employed in making small castings, and particularly pertains to a mold box which is especially applicable for use in forming the plastic investment used in molding dental inlays and like small articles from the rare metals, such as platinum, gold, silver, and their various alloys.

It is customary in the making of minute castings to form a wax pattern of the object to be cast, then forming a mold or investment by encompassing the wax pattern in a body of plaster, usually made from plaster of Paris; a mixture of the plaster of Paris and water being poured around the pattern in a box containing the wax pattern, and its accompanying stems for forming the necessary feed passages in the mold. The plaster is allowed to set and is dried, whereupon the mold body is heated to melt the wax, which is then poured from the mold body, thereby forming an investment having the desired mold cavities.

An object of the invention is to provide a mold box for forming such investments, which is so constructed as to quicken the setting and drying of the plastic by absorbing moisture therefrom, and in so doing serve to render the body of the investment more dense and compact and thereby eliminating detrimental shrinkage and distortion of the investment on subjecting it to heat.

Another object is to provide an investment mold box which embodies an absorptive shell or jacket against which the plastic for forming the investment contacts, and which serves to form the sidewall boundary of the investment body.

A further object is to provide an absorptive shell or jacket which is so formed and constructed that it may be readily applied to and removed from a metallic investment reinforcing frame.

With the foregoing objects in view, together with such other objects and advantages as may subsequently appear, I carry the invention into effect by employing the parts and the construction, arrangement and combination of parts, or the equivalents thereof, substantially as illustrated in the accompanying drawing, in which:

Figure 1 is a perspective view of the mold box;

Fig. 2 is a view of same as seen in vertical section;

Fig. 3 is a view in perspective of the reinforcing and retaining frame;

Fig. 4 is a perspective view of the absorption shell; and

Fig. 5 is a detail in cross-section as seen on the line 5—5 of Fig. 2.

Referring to the drawings more specifically A indicates a metallic frame adapted to serve as a retainer and reinforcement for the investment body, and B designates the absorptive shell or jacket which is adapted to encompass the frame A.

The frame is here shown as comprising a series of annuli or rings C, D, and E, which are of corresponding size and are arranged in spaced superposed relation; being connected together by vertical posts F, G, H, and I, which are arranged equidistant apart and extend from the upper and lower sides of the intermediate annules D to the adjacent faces of the end annules C and D. The members of the frame are preferably cast of metal and form in their ensemble a one piece unitary frame structure which is here shown as being of general cylindrical form.

The shell B is in the form of an open ended cylinder and is adapted to receive the frame A which is inserted within the shell as shown in Figures 1 and 2.

The shell is formed of any suitable moisture absorptive material; an unsized paper being found to answer the purpose very satisfactorily and which paper may be wound spirally in superposed layers to form a tube of suitable length that may be cut to the desired lengths in the same fashion as is employed in the manufacture of the ordinary paper mailing tubes of commerce. It is desirable, however, that the shell be of such absorptive character as to readily absorb moisture somewhat in the manner of blotting paper, and hence a loose fiber paper is preferably employed in its construction.

The shell B is formed of a length approximating that of the frame A, being preferably formed of a length slightly greater than that of the frame, so as to project a short distance beyond the ends thereof, as shown in Fig. 2.

In the operation of the invention, the retaining member A is inserted in the shell as shown in Fig. 2, and the wax pattern is mounted in the box, thus formed, in the usual manner, whereupon the box is placed with one of its open ends seating on a slab in the usual fashion, and the plaster of Paris mixture is then poured into the open upper end of the mold box. The absorptive wall or shell immediately absorbs water from the mixture, and in so doing acts to quicken the set of the plaster and also serves to render the plaster mass more dense and compact, and whereby the resultant investment will have little or no porosity. The rapidity of the set of the plaster is such that it may be dried in a few moments after being poured and the plaster finally dried and heated to remove the wax pattern without distortion of the investment.

While I have shown and described a specific embodiment of the invention, I do not limit myself to the exact construction herein set forth, and may employ such modifications and changes as come within the scope of the appended claims.

I claim:

1. An investment mold box having a wall formed of absorptive material and adapted to absorb moisture from the plaster poured into the mold.

2. An investment mold box comprising a retaining frame and an absorptive shell surrounding the frame.

3. An investment mold box comprising a frame formed of a series of spaced rings connected together in axial alignment, and an open ended tubular shell formed of absorptive material, surrounding said frame.

4. In an investment mold box, a cylindrical open ended tube formed of absorptive material.

STANLEY E. NOYES.